(12) United States Patent
Hendrichs et al.

(10) Patent No.: US 6,646,994 B1
(45) Date of Patent: Nov. 11, 2003

(54) SYSTEM AND METHOD FOR CONTROLLING DISTORTION IN THE POTS BAND IN A DUAL POTS AND DISCRETE MULTI-TONE COMMUNICATION SYSTEM

(75) Inventors: Laurent Hendrichs, Long Branch, NJ (US); Hubert de Lassus, Highlands, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

(21) Appl. No.: 09/471,685

(22) Filed: Dec. 23, 1999

Related U.S. Application Data (60) Provisional application No. 60/113,912, filed on Dec. 28, 1998.

(51) Int. Cl.[7] .................................................. H04L 12/26
(52) U.S. Cl. ..................................... 370/252; 370/248
(58) Field of Search ................................ 370/252, 465, 370/467, 466, 248, 249; 375/222, 227, 346, 221, 358; 379/1.01, 1.04, 9, 27.01, 29.01

(56) References Cited

U.S. PATENT DOCUMENTS

| | | | | |
|---|---|---|---|---|
| 6,101,216 A | * | 8/2000 | Henderson et al. ......... | 375/222 |
| 6,151,335 A | * | 11/2000 | Ko et al. ..................... | 370/487 |
| 6,212,227 B1 | * | 4/2001 | Ko et al. ..................... | 375/222 |
| 6,263,077 B1 | * | 7/2001 | Zuranski et al. ............ | 379/410 |
| 6,292,559 B1 | * | 9/2001 | Gaikwad et al. ............ | 379/417 |
| 6,356,585 B1 | * | 3/2002 | Ko et al. ..................... | 375/222 |
| 6,366,555 B1 | * | 4/2002 | Gatherer et al. ............ | 370/210 |
| 6,456,650 B1 | * | 9/2002 | Cheng et al. ............... | 375/222 |
| 6,459,678 B1 | * | 10/2002 | Herzberg .................... | 370/203 |

* cited by examiner

*Primary Examiner*—Steven Nguyen
*Assistant Examiner*—Toan Nguyen
(74) *Attorney, Agent, or Firm*—Thomas, Kayden, Horstemeyer & Risley (57) ABSTRACT

The present invention is directed to a system and method for minimizing signal distortion in a discrete multi-tone communications system that is being used in both the POTS and the ADSL frequency bands. Broadly, the system and method of the present invention are realized by a digital signal processor that is configured to insert a probe signal into the upstream channels of the communication system, measure the resulting signal distortion in the downstream channels, and adjust the upstream signal power to minimize system signal distortion due to the upstream data transmission. The system and method further estimates the POTS band signal distortion based on the measured distortion at the higher frequencies, and adjusts the output signal power at the central office equipment to minimize signal distortion at the customer premises.

23 Claims, 10 Drawing Sheets

FIG. 1

(Prior Art)

FIG. 2

(Prior Art)

SYSTEM AND METHOD FOR CONTROLLING DISTORTION IN THE POTS BAND IN A DUAL POTS AND DISCRETE MULTI-TONE COMMUNICATION SYSTEM

CROSS-REFERENCE TO RELATED APPLICATION

The present application claims the benefit of U.S. provisional patent application, Ser. No. 60/113,912, filed Dec. 28, 1998, which is hereby incorporated by reference in its entirety.

BACKGROUND OF THE INVENTION

1. Field of the Invention

The present invention generally relates to communication systems, and more particularly, to a system and method for minimizing signal distortion in both the plain old telephone system (POTS) frequency band and in the asynchronous digital subscriber line (ADSL) upstream and downstream frequency bands in communication systems capable of concurrent communications in both the POTS and the ADSL frequencies.

2. Discussion of the Related Art

In recent years, telephone communication systems have expanded from traditional POTS communications to include high-speed data communications as well. As is known, POTS communications include the transmission of voice information, control signals, public switched telephone network (PSTN) information, as well as, information from ancillary equipment in analog form (i.e., from computer modems and facsimile machines) transmitted in the POTS bandwidth.

Prompted largely by the desire of large businesses to reliably transfer information over a broadband network, telecommunications service providers have employed discrete multi-tone, hereinafter DMT, systems to provide a plethora of interactive multi-media digital signals over the same existing POTS twisted-pair lines. DMT systems, by nature of their distribution across multiple frequency bands, are capable of retuning devices to optimize data transfer for changing line conditions. DMT devices selectively transfer bits from the data stream in those discrete frequency bands that are uncorrupted from amplitude modulation radio interference and unaffected by phone system bridge taps, thereby tuning, or maximizing performance under changing conditions.

The provision of digital subscriber lines (DSL) systems to customer premises has proliferated over recent years. DSL communications systems use the DMT standard and are interactive two-way communications systems. Since DSL signals are transmitted in a higher frequency band than that of the POTS frequency band, transmitting signals from both the POTS and DSL frequency bands over the same twisted-pair telephone line (even at the same time), generally is not a problem. Specifically, the POTS frequency band is generally defined from 0 Hz to 4 kHz, while DSL frequency bands are generally defined by a lower cutoff frequency of approximately 26 kHz, and an upper cutoff frequency of approximately 1 MHz.

In the past, a combination of circuits termed hybrids and POTS splitters have served to buffer DSL equipment from distortion and interference introduced in the DSL frequency bands from the lower frequency POTS equipment. In a DMT-G.Lite standard configuration, the POTS splitter is no longer present. As a result, DSL equipment operated on the same twisted-pair phone line that is being used to deliver POTS service is subject to distortion due to the presence of nonlinear electronic devices in the POTS equipment. The presence of nonlinear devices in telephone sets, i.e., voltage limiters, amplifiers, and transformers, among others, causes the DSL signal to distort. The distortion band extends from 0 Hz up to several times the maximum frequency of the DSL signal. Signal distortion occurs primarily at customer premises as it is much more likely to find DSL equipment in close proximity to POTS devices at customer locations rather than at central offices.

Since the distortion band spans from 0 Hz to a frequency greater than the maximum frequency band used in a DMT system, distortion adversely affects both POTS and DSL signals. Distortion in the POTS band causes discernible noise in the voice band and disturbs telephone conversations. Distortion in the DSL band reduces the signal to noise ratio across the full range of upstream and downstream spread spectrum signals. As a result, DSL performance is adversely affected in both the upstream and downstream channels.

DSL signal distortion is acute for DMT based modems because of the higher peak to RMS ratio of a DMT modulated signal. Because a DMT signal is merely a sum of sinusoids each with a different frequency and phase, it is possible that all 32 upstream channel sinusoids could coincide resulting in an extreme signal amplitude. Distortion is almost always dependent upon signal amplitude. As a result, signals with a high peak to average ratio, such as DMT signals, suffer more from distortion effects than a signal designed with a lower peak to average ratio, e.g. a quadrature amplitude modulated (QAM) signal.

Therefore, it is desired to maximize performance in a dual POTS-DSL communications system using the DMT standard by minimizing signal distortion. Since nonlinear distortion is a function of signal power, a method is desired to adjust downstream signal power in real time to reduce distortion interference. However, the presence of high-pass filters in the DSL equipment prohibit the direct measurement of signal distortion in the POTS frequency band by DSL equipment. With no direct capability of measuring POTS band signal distortion, DSL systems designers have been constrained to indirect estimations of POTS band distortion.

A common solution to enable the measurement of POTS band distortion consists of adding a programmable bypass circuit to the customer premises hardware. This solution is considered undesirable as it adds to both the initial purchase and long-term operating expense of the dual POTS—DSL communication system.

Prior art methods of measuring distortion include one and two-sinusoids tests. The tests insert known test signals into a system and measure the output signal at distinct frequencies. The amplitude of the system response to the sinusoidal test signals at distinct frequencies is proportional to the coefficients of a polynomial model of the communication system. By measuring signal distortion at those frequencies, it is possible to estimate each of the polynomial coefficients. However, intermodulation power can be extremely small and is often overcome by thermal noise and the dynamic range of the system. Often the amplitude of the sinusoidal test signal falls below the noise threshold making it impossible to use this technique to measure distortion.

Accordingly, it is desired to provide a system and method that efficiently measures signal distortion in the DSL frequency band (a wideband signal) in order to. adjust downstream signal power to minimize distortion interference throughout both the POTS and DSL frequency bands without adding hardware to the communication system.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the objects and advantages of the present invention, the present invention is directed to a system and a method for measuring signal distortion in the downstream DSL frequency band to estimate echo distortion in the POTS band. The innovative solution of the present invention measures and regulates signal distortion, including that of the POTS band, based on downstream-band signal processing of the upstream echo. More specifically, the present invention measures distortion caused by a probe signal operating at an image frequency to estimate signal distortion in the POTS band for the full bandwidth of the upstream signal. Once an estimate of the POTS band distortion is available, the method adjusts the transmit power level in order to minimize signal distortion. The distortion reduction method consists of adjusting the transmit power of a R-REVERB sequence, called R-LINE-PROBE in the ADSL-DMT standard, until the noise observed in the downstream band falls below a predetermined threshold. Having determined an optimum upstream signal power cutback value, the method then uses the relationship between the optimized upstream signal power cutback value to determine a downstream signal power cutback value to minimize signal distortion in the system.

The system and method of the present invention combines the following ideas to minimize signal distortion at the customer premises in a ADSL-DMT communication system. The system uses a quasi-random periodic signal as a probe signal to measure signal distortion. The system further uses the measured signal distortion to estimate signal distortion in the POTS frequency band. Based on the estimated signal distortion in the POTS frequency band and a predetermined acceptable level of distortion, the system adjusts the downstream power cutback value.

The system and method of the present invention has a number of advantages that will be briefly summarized below. The system benefits from improved accuracy of signal distortion measurements as a direct result of using a wide-band probe signal. The method is adaptive, in that an optimum signal cutback value is determined based on system parameters for each particular customer premises ADSL equipment. The method requires only addition and multiplication operations. As a result, the method is fast and easily implemented on a digital signal processor. Additionally, the method provides an easy derivation of the optimum downstream signal power cutback value.

Importantly, the system and method of the present invention does not require addition or improvement to existing hardware. The method does not require a time and software code consuming alignment of the customer premises receiver to the transmitted probe signal. Lastly, the system will minimize signal distortion from sources other than the customer premises POTS equipment. In this regard, the system will minimize signal distortion due to line drivers, receiver amplifiers, and transformers. The system will enhance signal quality at the customer premises by reducing distortion across the full range of POTS and ADSL-DMT frequencies.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
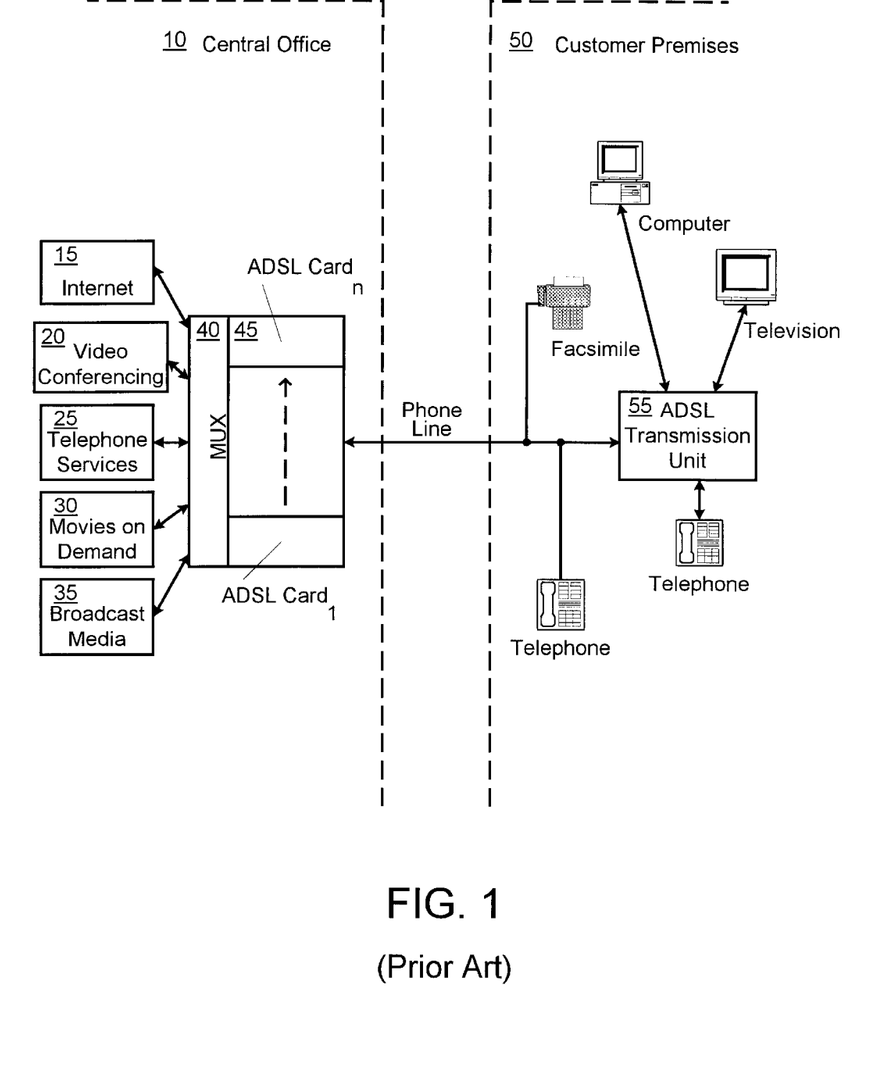
FIG. 1 is a block diagram illustrating the delivery of multiple broadband services via a communications system on a telephone line.

Turning now to the drawings, reference is made to FIG. 1 which illustrates the delivery of broadband communication services via a DSL over the POTS network. In this regard, a central office 10 is configured to receive broadband services which it assembles via central office asynchronous digital subscriber line (ADSL) cards 45 for transmission over a POTS phone line to customer premises 50. Examples of such broadband services are depicted in FIG. 1 as Internet 15, video conferencing 20, telephone services 25, movies on demand 30, and broadcast media 35. Central office 10 assembles signals from the aforementioned broadband services via mux 40 for appropriate transformation and transmission by ADSL cards 45.

Customer premises 50 has a compatible ADSL transmission unit 55, which processes and distributes the several services to appropriate destination devices such as a computer, television, and a telephone as illustrated. It is significant to note that customer premises 50 may have POTS devices such as the facsimile machine and another telephone integrated on the PSTN line along with ADSL transmission unit 55. On/off hook impedance transitions introduced by POTS devices such as the telephone and the facsimile machine illustrated in FIG. 1 can interrupt ADSL communications that must traverse the same PSTN line. It should be understood that the circuitry conventionally implemented in, for example, an ADSL transceiver will be included within ADSL cards 45 and ADSL transmission unit 55 as shown in FIG. 1. The implementation of such circuitry will be appreciated by persons skilled in the art, and need not be described herein.

Figure 2:
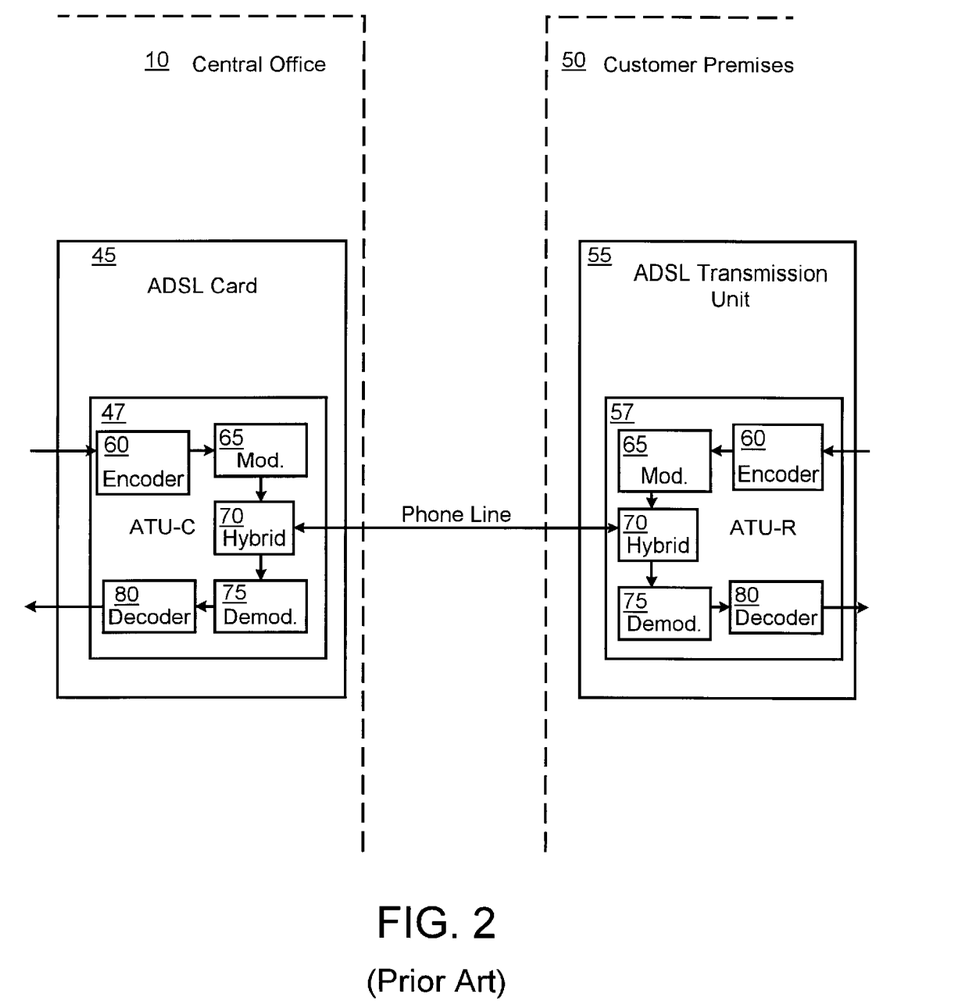
FIG. 2 is a functional block diagram illustrating a communications system in accordance with FIG. 1.

Having provided a top level description of the environment surrounding a communications system in accordance with the present invention, reference is now made to FIG. 2, which illustrates a portion of ADSL card 45 and ADSL transmission unit 55 as shown in FIG. 1. In this regard, ADSL card 45 contains an ADSL transmission unit—central office, hereinafter ATU-C 47. Similarly, ADSL transmission unit 55 contains an ADSL transmission unit—remote, hereinafter ATU-R 57. Both ATU-C 47 and ATU-R 57 serve to enable two-way communications between ADSL card 45 and ADSL transmission unit 55 via the PSTN. Since each ATU is similarly configured, the description herein will address the five functional blocks only once. Both ATU-C 47 and ATU-R 57 receive digital data in encoder 60. Encoder 60 processes the digital data and forwards it to modulator 65 which adaptively applies the digital data across the DMT frequencies. Modulator 65 then forwards a multitude of designated spread spectrum frequencies to hybrid 70 for data transmission along the PSTN line. In the manner described above, data is assembled, adaptively applied, and transmitted from one ADSL device to another across each of the separate DMT channels as the physical characteristics of the environment surrounding each individual system allows.

Similarly, hybrid 70 is configured to receive a multitude of spread spectrum frequencies from the remote ADSL transmission unit along the PSTN line. Hybrid 70 forwards designated spread spectrum frequencies to demodulator 75. Demodulator 75 processes the set of spread spectrum frequencies to remove digital data. Demodulator 75 forwards the digital data to decoder 80. Decoder 80 processes the digital data and distributes it to the appropriate broadband device.

Figure 3:
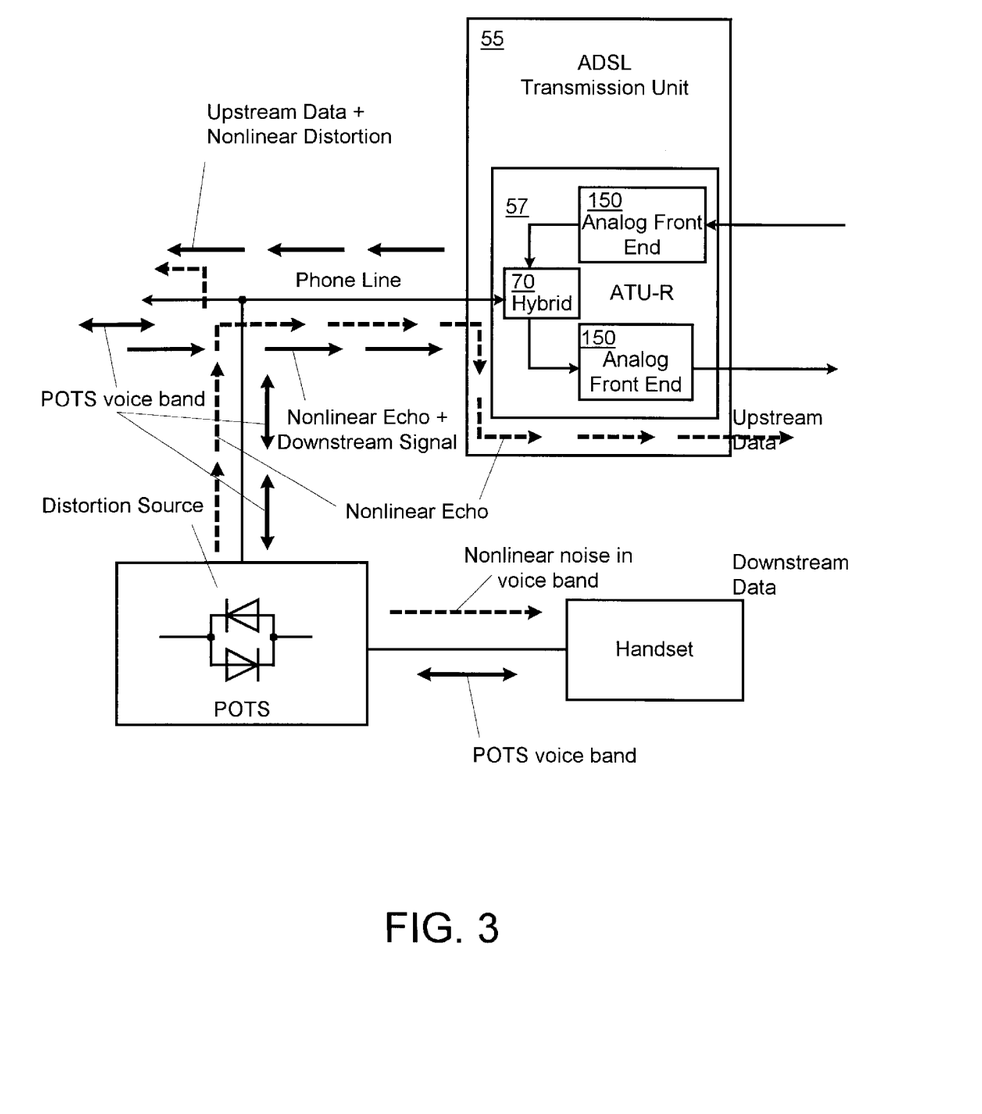
FIG. 3 is a diagram illustrating nonlinear echo in a portion of the communications system of FIG. 2.

Having described an ADSL communication system in FIGS. 1 and 2 reference is now made to FIG. 3 which illustrates nonlinear signal distortion in a splitterless DMT G.Lite configuration. In this regard, ATU-R 57 within ADSL transmission unit 55 at customer premises (not shown) receives and transmits broadband signals along a phone line. In a splitterless G.Lite configuration, POTS equipment and a handset may be interconnected on the same phone line. Signal distortion caused by nonlinear devices in the POTS equipment is reflected to the phone line where it adversely affects both the upstream and downstream signals by reducing the signal to noise ratios of the signals. A fraction of the signal distortion is also sent to the handset, resulting in an unpleasant noise in the earphone.

In accordance with a fundamental aspect of the present invention, it can be shown that the nonlinear distortion from a POTS device is such that its behavior can be modeled with a third order polynomial, as in Equation 1 below:

$$y = a_1 x + a_2 x^2 + a_3 x^3. \quad \text{Eq.1}$$

Where, x and y are the incident and reflected voltages respectively.

If the DMT signal is assumed to be Gaussian with power spectral density, $\gamma(f)$, second and third order distortion noise spectral densities can be represented by the following equations:

$$\gamma_2(f) = 2 \cdot (\gamma \otimes \gamma)(f), \quad \text{Eq.2}$$

$$\gamma_3(f) = 3 \cdot (\gamma \otimes \gamma \otimes \gamma)(f). \quad \text{Eq.3}$$

Accounting for the first two assumptions, that the nonlinear device can be modeled with a third order polynomial and that the spectrum of the DMT signal has a uniform spectral density, the result of the convolutions in Equations 2 and 3 above can be expanded as:

$$\gamma_2(f) = \gamma_{2,max} \cdot \left[ \gamma_{2,n}\left(\frac{f}{B}\right) + \frac{1}{2} \cdot \left[ \gamma_{2,n}\left(\frac{f - 2f_c}{B}\right) + \gamma_{2,n}\left(\frac{f + 2f_c}{B}\right) \right] \right], \quad \text{Eq. 4}$$

$$\gamma_3(f) = \gamma_{3,max} \cdot \left[ \gamma_{3,n}\left(\frac{f - f_c}{B}\right) + \gamma_{3,n}\left(\frac{f + f_c}{B}\right) + \frac{1}{3} \cdot \left[ \gamma_{3,n}\left(\frac{f - 3f_c}{B}\right) + \gamma_{3,n}\left(\frac{f + 3f_c}{B}\right) \right] \right], \quad \text{Eq. 5}$$

where, $$\gamma_{2,n}(F) = (1 - |F|) \cdot (|F| \leq 1);$$

$$\gamma_{3,n}(F) = \left(1 - \frac{1}{2} \cdot \left(\frac{F}{0.75}\right)^2\right) \cdot (|F| \leq 0.75) + \frac{1}{2} \cdot \frac{(|F| - 1.5)^2}{0.75^2} \cdot (0.75 < |F| \leq 1.5);$$

$$\gamma_{2,max} = 4 a_2^2 B \gamma_0^2; \text{ and}$$

$$\gamma_{3,max} = \frac{27}{2} a_3^2 B^2 \gamma_0^3.$$

Figure 4:
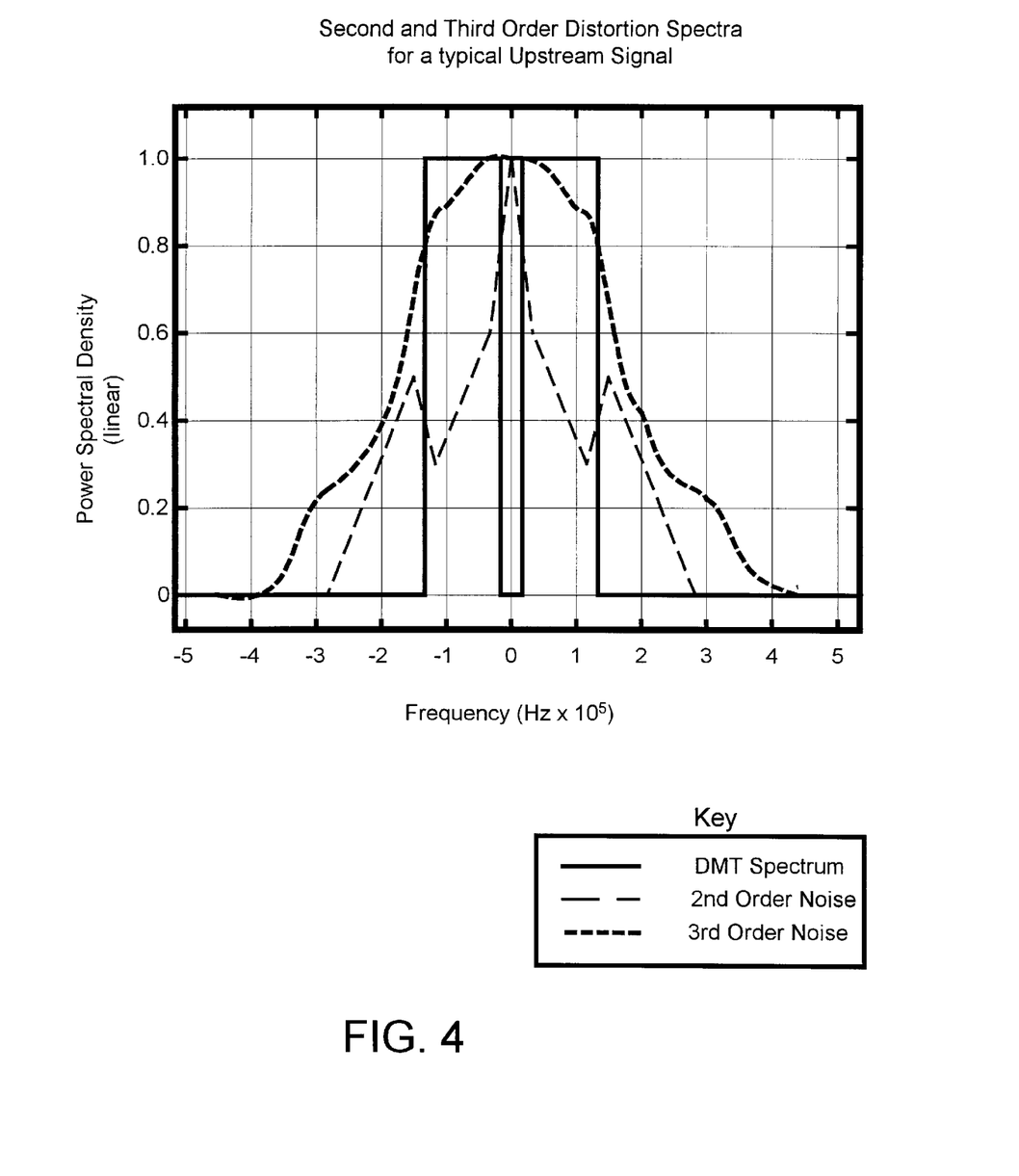
FIG. 4 is a diagram illustrating the distortion spectrum for a typical upstream signal in a DMT communication system.

The distortion spectra are represented in FIG. 4 for a typical upstream signal in a DMT system where standard tones 6 through 32 are used. The graph of FIG. 4 clearly shows that distortion noise is present in the POTS band as well as at higher frequencies. FIG. 4 also illustrates that upstream distortion noise could also adversely affect performance of the received signal since it extends across DMT tones used for downstream data transmission. As a result, the interest in limiting nonlinear distortion is twofold. First, it will help to reduce voice band noise in the POTS handset. Second, it will improve downstream performance by reducing distortion power in the downstream data bands.

With the assumptions above and the expanded expression of the distortion power spectral density, it is possible to define a probe signal and a method for estimating POTS band distortion. In short, the method measures signal distortion power at the higher DSL frequencies to estimate the POTS band distortion.

What is desired is a frequency, $f_x$, such that:

$$\gamma_2(f_x) = K \cdot \gamma_2(0), \text{ and}$$

$$\gamma_3(f_x) = K \cdot \gamma_3(0). \quad \text{Eq.6}$$

Figure 5:
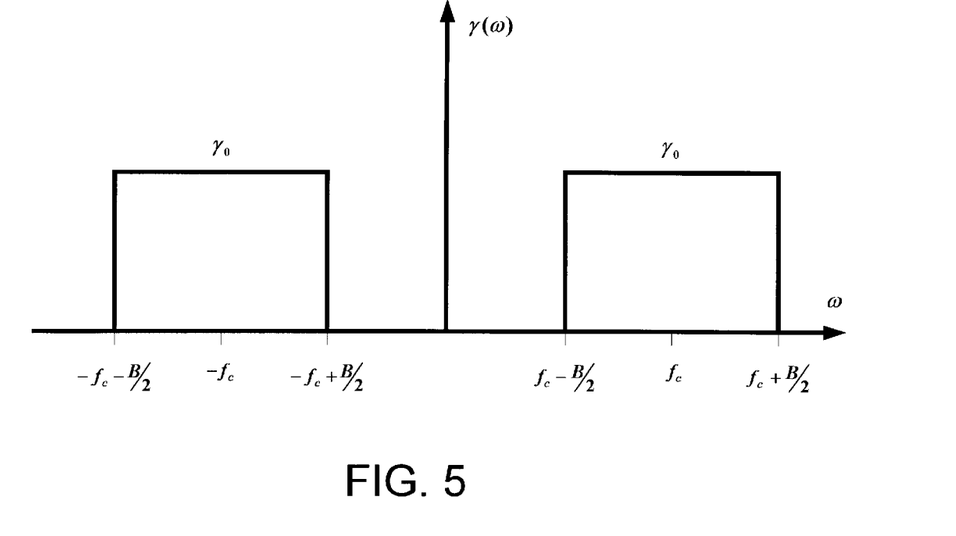
FIG. 5 is a diagram illustrating the spectral density of an upstream probe signal to be transmitted by the communication system of FIG. 2.
Figure 6:
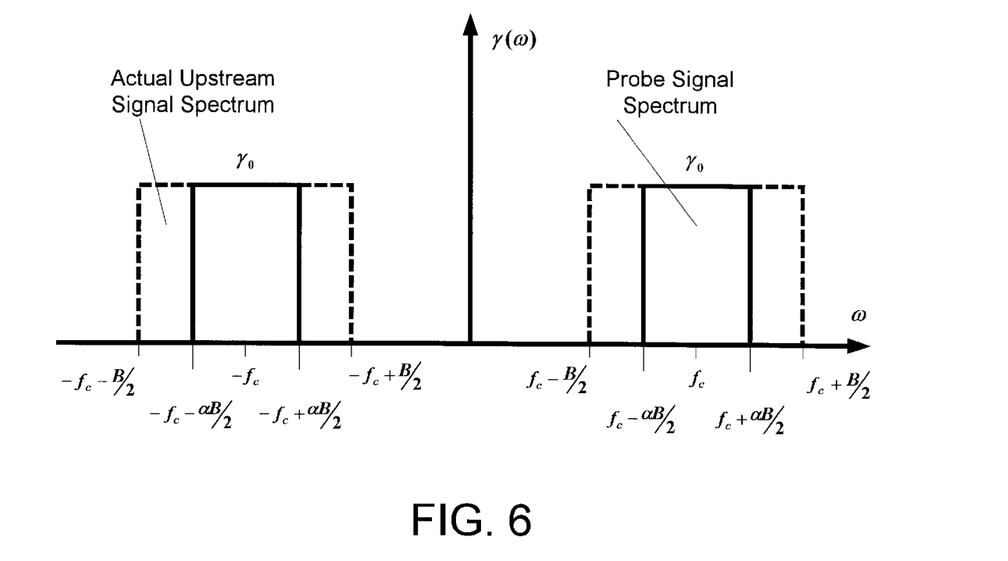
FIG. 6 is a diagram illustrating the relationship between the spectral density of the upstream signal to be transmitted as shown in FIG. 5 and the spectral density of a probe signal.

For the frequency range of interest, this set of equations does not have a solution. However, it is possible to use a probe signal with a different spectrum from the actual upstream signal spectrum to model the upstream spectrum. FIGS. 5 and 6 illustrate the relationship between the actual upstream signal and the probe signal of the present invention. If the probe signal is designed with the following properties:

$f_{c,probe}=f_c$, $B_{probe}=\alpha \cdot B$, where $\alpha<1$ and $\gamma_{0,probe}=\gamma_0$.

An image frequency, $f_x$, can be found such that distortion caused by the probe signal at $f_x$ is, with a good approximation, proportional to the distortion in the POTS band for the full bandwidth upstream signal. Equation 7 below illustrates the approximation.

$$\gamma_{dist,probe}(f_x) \cong K \cdot \gamma_{dist,US}(0). \qquad \text{Eq.7}$$

Coefficient K and frequency $f_x$ can be pre-calculated. For example, if the upstream signal consists of DMT tones 6–32, using $\alpha=0.8$ yields K=0.176, $f_x$=149.7 kHz.

By manipulating Equation 7, an estimate of POTS band distortion may be represented as follows:

$$\gamma_{dist,US}(0) \cong K^{-1} \cdot \gamma_{dist,probe}(f_x). \qquad \text{Eq.8}$$

A frequency can be found that satisfies the following relationships:

$$\gamma_{2,probe}(x)=K \cdot \gamma_2(0),$$

$$\gamma_{3,probe}(x)=K \cdot \gamma_3(0). \qquad \text{Eq.9}$$

The distortion spectrum of the probe signal can be expanded as:

$$\gamma_{2,probe}(f) = \qquad \text{Eq. 10}$$

$$\gamma_{2,max,probe} \cdot \left[\gamma_{2,n}\left(\frac{f}{aB}\right) + \frac{1}{2} \cdot \left(\gamma_{2,n}\left(\frac{f-2f_c}{aB}\right) + \gamma_{2,n}\left(\frac{f+2f_c}{aB}\right)\right)\right],$$

$$\gamma_{3,probe}(f) = \gamma_{3,max,probe} \cdot \left[\gamma_{3,n}\left(\frac{f-f_c}{aB}\right) + \right.$$

$$\left. \gamma_{3,n}\left(\frac{f+f_c}{aB}\right) + \frac{1}{3} \cdot \left(\gamma_{3,n}\left(\frac{f-3f_c}{aB}\right) + \gamma_{3,n}\left(\frac{f+3f_c}{aB}\right)\right)\right];$$

where, $\gamma_{2,max,probe}=\alpha \cdot \gamma_{2,max}$, and $\gamma_{3,max,probe}=\alpha^2 \cdot \gamma_{3,max}$.

Further expanding Equation 10 yields, $$F_1(f_x) = \left[\gamma_{2,n}\left(\frac{f_x}{aB}\right) + \frac{1}{2} \cdot \left[\gamma_{2,n}\left(\frac{f_x-2f_c}{aB}\right) + \gamma_{2,n}\left(\frac{f_x+2f_c}{aB}\right)\right]\right] =$$

$$\left(\frac{\gamma_{2,n}(0)}{2 \cdot \gamma_{3,n}\left(\frac{f_c}{B}\right)}\right) \cdot a \cdot \left[\gamma_{3,n}\left(\frac{f_x-f_c}{aB}\right) + \gamma_{3,n}\left(\frac{f_x+f_c}{aB}\right) + \right.$$

$$\left. \frac{1}{3} \cdot \left[\gamma_{3,n}\left(\frac{f_x-3f_c}{aB}\right) + \gamma_{3,n}\left(\frac{f_x+3f_c}{aB}\right)\right]\right] = F_2(f_x)$$

Figure 7:
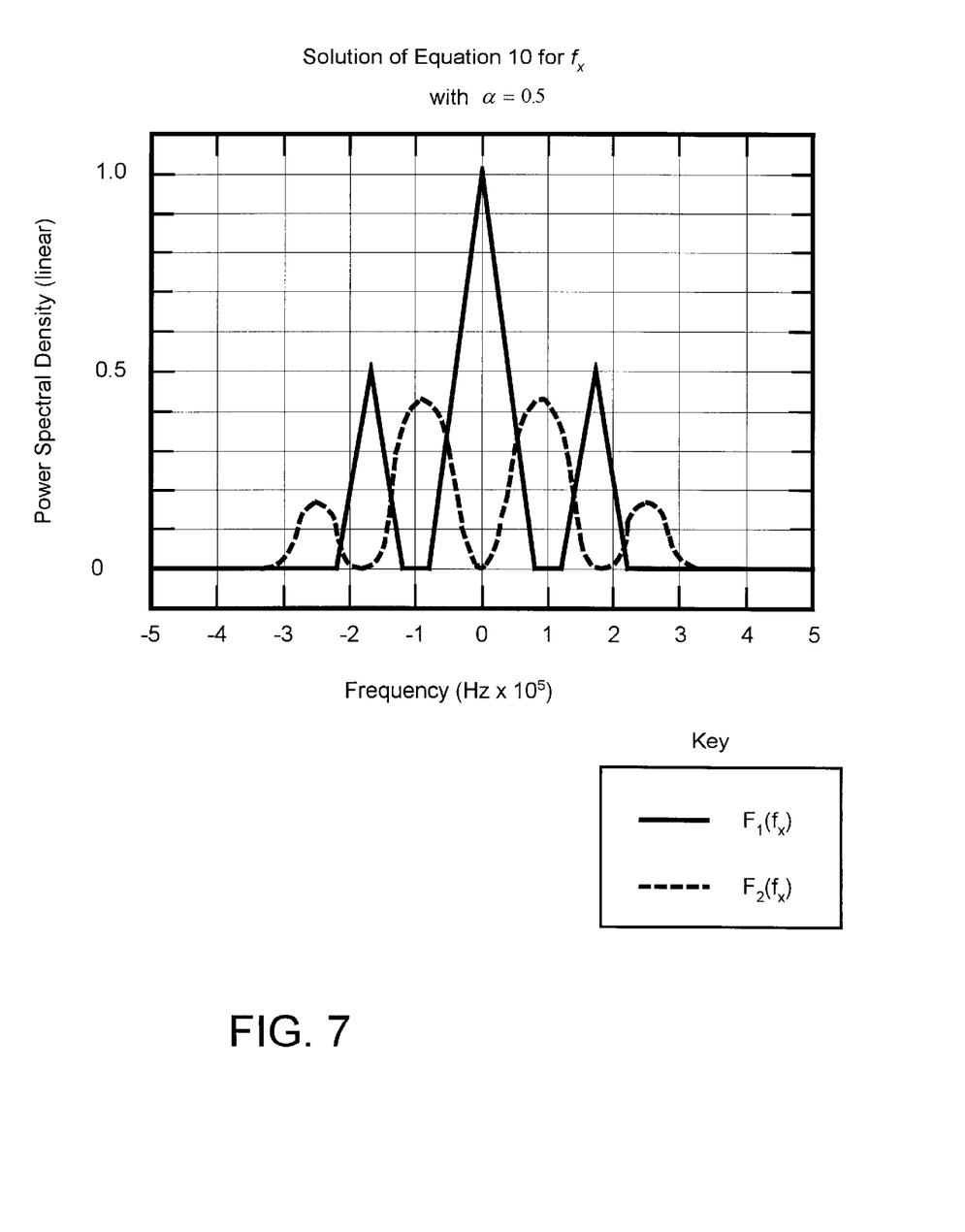
FIG. 7 is a diagram illustrating the solution of Equation 8 for $f_x$.

FIG. 7 illustrates both the second and third order terms for Equation 10 for $\alpha=0.5$. The only solution, that is, a location on the plot where $F_1 f(x)=F_2 f(x)$, that is greater than the cutoff frequency of the receive filter, 138 kHz, occurs where f(x)=210.45 kHz. That particular frequency corresponds to standard tone 49 in a DMT communication system. For that solution, the value of K is 0.05. If you bypass the receive filter, f(x)=128.5 kHz (standard tone 30) would represent another acceptable solution. The corresponding value of K for tone 30 is 0.1.

If $\alpha=0.8$, Equation 10 yields two solutions as follows:

$f(x)$=149.7 kHz, $K$=0.176(DMT standard tone 35); and $f(x)$=216.3 kHz, $K$=0.48(DMT standard tone 51).

Extension of the Model for Higher-Order Non-Linearities

If the non-linearity of the reflected distortion signal cannot be adequately modeled by a third order polynomial, the model heretofore presented will not apply because it will be impossible to isolate a single frequency where the total non-linear noise is proportional to the noise present in the POTS band (the number of simultaneous equations to satisfy increases while the number of variables remains fixed at three).

$\gamma_{2,probe}(x)=K \cdot \gamma_2(0)$;

$\gamma_{3,probe}(x)=K \cdot \gamma_3(0)$;

$\gamma_{4,probe}(x)=K \cdot \gamma_4(0)$;

$\gamma_{5,probe}(x)=K \cdot \gamma_5(0)$;

.
.
.

$\gamma_{n,probe}(x)=K \cdot \gamma_n(0)$.

Figure 8:
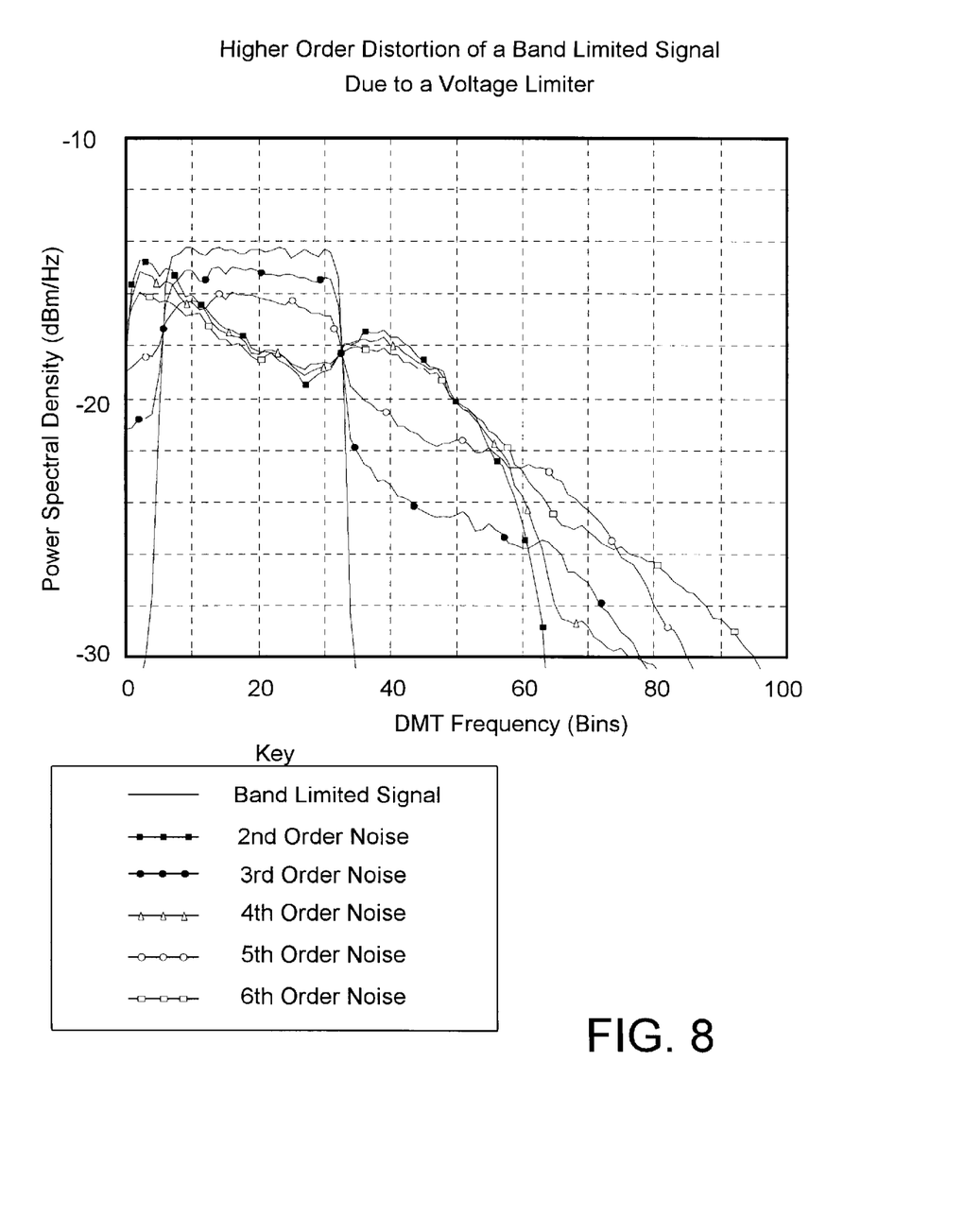
FIG. 8 is a graph illustrating higher order distortion of a band limited signal caused by a voltage limiter of the type commonly used in POTS equipment.

Fortunately, higher order non-linearities have interesting properties. FIG. 8 illustrates the distortion spectra for $2^{nd}$ to $6^{th}$ order non-linear signal distortion for a band-limited Gaussian signal. The spectra in FIG. 8 have been normalized for a total signal power of 1 Watt. As can be seen in FIG. 8, the higher the distortion order, the wider and the flatter the noise spectrum. For odd orders, the spectrum is reasonably symmetrical on both sides of the center frequency of the band limited signal. Even order distortion spectra reveal a higher level below the signal band than that above the signal band. As a result, the total distortion power spectral density is similar in amplitude for higher order nonlinear distortion of band limited signals both above and below the signal band of interest. The implication of this property is that POTS band distortion can be estimated with reasonable accuracy by measuring the distortion spectrum in the ADSL downstream signal band.

Figure 9:
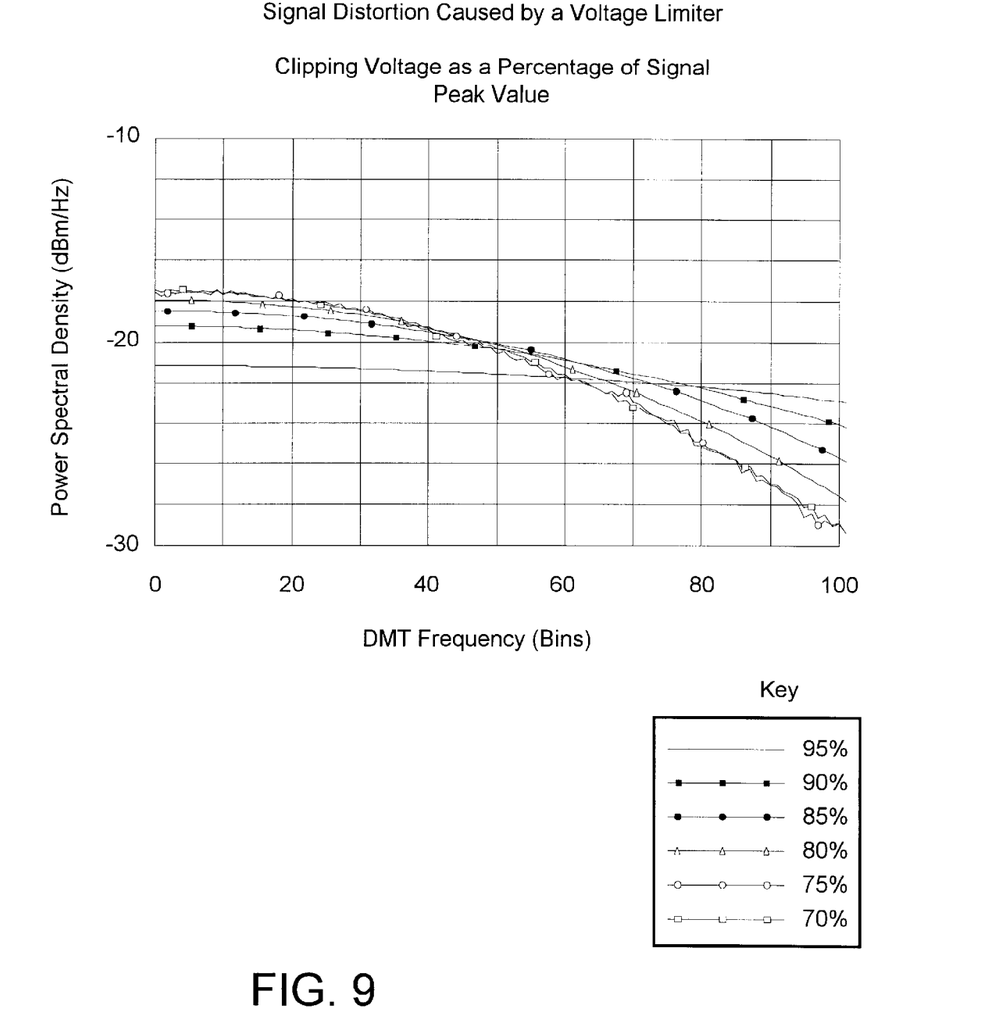
FIG. 9 is a graph illustrating signal clipping voltage as a percentage of signal peak value.

FIG. 9 further demonstrates this property by simulating signal distortion caused by a voltage limiter, such as those used in POTS handsets. From the graph, it is clear that the previously drawn conclusions apply. That is, distortion in the ADSL downstream frequency band is similar in amplitude to distortion in the POTS frequency band, as both levels differ by only a few dB.

Once an estimate of POTS band distortion is available, deriving a method for adjusting the transmit power level in the upstream data path in order to avoid nonlinear echo distortion is straightforward. If the acceptable signal to noise ratio (SNR) is defined as s, the following equation gives the acceptable standard deviation for the distortion noise (adl= acceptable distortion level):

$$\sigma_{adl} = \sigma / \sqrt{10^{s/10}}. \qquad \text{Eq. 11}$$

The general result above applies to signals defined digitally in 2's complement format over 20 bits. For DMT applications, the equation may be applied indifferently in both the time and frequency domains. As a result, all measurements may be made in the frequency domain. To ensure a target SNR of s dB on a particular tone, the distortion standard deviation will have to be reduced to $\sigma_{adl}$ for that particular tone.

The acceptable distortion level, $\sigma_{adl}$, will be used as a criterion to adjust the system transmit power. If measured distortion is higher than $\sigma_{adl}$, the downstream transmit power will be reduced. Conversely, if the measured distortion is below $\sigma_{adl}$, the downstream transmit power will be increased to increase the downstream channel SNR thereby permitting an increase in the downstream data bit rate.

Estimating the Standard Deviation of Distortion Noise

Having determined a digital representation of an acceptable level of distortion noise, an estimator of that level must be determined to enable distortion control. Measuring the power of potentially low amplitude signals with a fixed precision DSP is challenging. An unbiased estimator of the variance of a random variable n is as follows:

$$\hat{\sigma}_n^2 = \frac{\sum_{i=1}^{N}(n_i - \hat{\mu}_n)^2}{N-1}, \qquad \text{Eq. 12}$$

where, $$\hat{\mu}_n = \frac{\sum_{i=1}^{N} n_i}{N},$$

and N is the number of samples.

Unfortunately, the estimator for $\sigma_n^2$ involves squaring operations that present problems in fixed point DSPs. The problems arise because the result of multiplying two small numbers is an even smaller number, which cannot be precisely represented with the same number of bits without a loss of precision. In some cases, if the factors are too small, the result goes to zero.

However, if the signal is Gaussian, the following equation applies:

$$E[|n|] = \rho \cdot \sigma = \rho \cdot \sqrt{E[(n-E[n])^2]} \text{ where, } \rho = 0.7978. \qquad Eq.13$$

In other words, the standard deviation, $\sigma$, can be derived from the expectancy of the absolute value of n, for which an estimator can be easily constructed as follows:

$$|\hat{n}| = \rho \cdot \hat{\sigma} = \frac{\sum_{i=1}^{N}|n_i|}{N}. \qquad \text{Eq. 14}$$

The estimator introduced above can be used to estimate the standard deviation, and hence variance, of the distortion noise in the frequency domain. This result is possible because a Fourier transform operation can be seen as a linear combination of random variables. Since the sum of a large number of variables always tends toward a Gaussian distribution, the equations above suffice as a relevant approximation.

Data that may be used for distortion measurement are the frequency domain values of the downstream tones just above the upstream signal band. As illustrated in FIG. 9, signal distortion decreases at higher frequencies. Relying on the spectral densities illustrated in FIG. 9, the best estimate of the POTS band distortion would appear to occur at frequencies just above the upstream signal band. However, due to the limited slope of the low-pass filter in the ADSL transmitter, a replica of the upstream probe signal appears in the downstream tones immediately above the upstream band. As a result, the system and method of the present invention measures signal distortion in DMT tones 45 to 60.

Synchronization

The theory introduced above is general and does not account for DMT modulation. In DMT systems, data bytes are grouped in packets of 32 complex numbers (for upstream modulation). On each group of 32 complex numbers, a fast Fourier transform is performed, resulting in a real signal of 64 samples. The packet of 64 time-domain samples is called a DMT symbol.

A DMT receiver decodes the data symbol by performing an inverse operation (an inverse Fourier transform). In order to accomplish this task, the receiver must be able to identify the border of the DMT symbol. In other words, the receiver must know where to start processing the series of 64 samples. Identifying the border of the symbol is called alignment.

Typically, ATU-R receivers are aligned to data symbols generated by the central office's ATU-C. Since power measurements of the present invention are performed at the customer premises on a signal transmitted by the customer premises, the probe signal will not be aligned. As a result, the customer premises receiver will perform an inverse Fourier transform on consecutive but different data symbols. When the symbols are different, a time-domain discontinuity results. The signal value discontinuity will introduce high frequency components in the received signal over the frequency bands of interest.

In order to eliminate the signal discontinuity at the signal symbol border, a periodic signal may be used as the probe signal. Since constant transmission of the same packet of 32 complex numbers at the transmitter will result in a continuous time-domain signal, the signal at the receiver will also be periodic and continuous even in the presence of a synchronization offset. Such a signal is available in the ADSL standard and is known as R-REVERB or R-LINE-PROBE.

Optimizing the Upstream Power Cutback

As previously stated, the ADSL-DMT G.Lite standard provides for both an upstream data signal power cutback, as well as, a downstream data signal power cutback. Finding the optimum downstream power cutback value is equivalent to solving the following equation:

$$\sigma(P) = \sigma_{adl}, \qquad Eq.15$$

where, P is the upstream transmit power spectral density.

Figure 10:
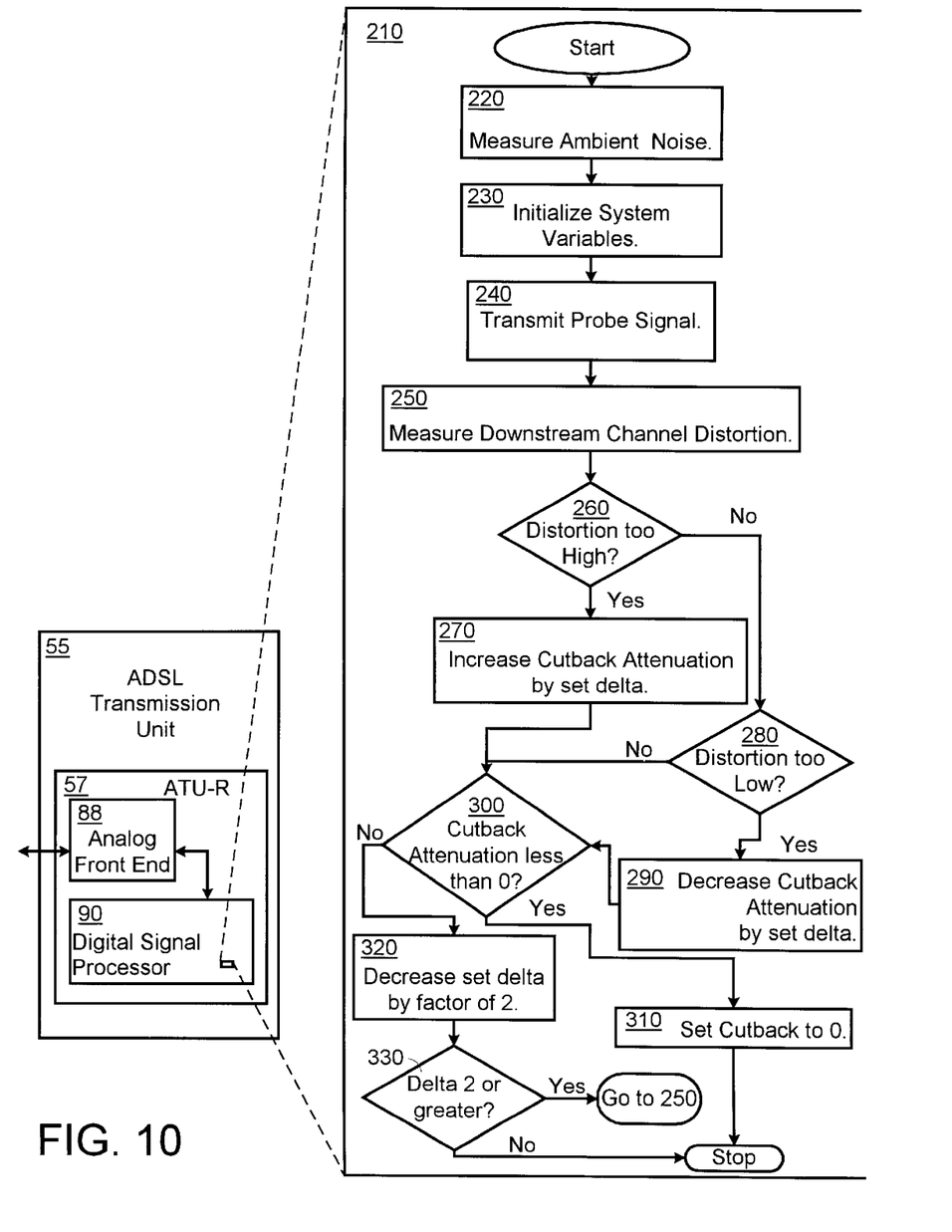
FIG. 10 is a diagram illustrating the method steps for reducing distortion in a DMT system.

The following method, illustrated in the flowchart of FIG. 10, may be used to optimize the upstream transmission power cutback value. Method 210 starts by measuring the ambient noise in select downstream tones at the customer premises receiver in step 220. The ambient noise may be measured by any of a number of methods known by those skilled in the art. Preferably, the downstream data signal is temporarily turned off while the ambient noise is measured.

Method 210, proceeds by initializing several system variables in step 230. More specifically, the acceptable distortion level, a cutback attenuation, and an initial cutback attenuation delta are set in step 230. Next, in step 240, a probe signal is transmitted in the upstream data channels. The method proceeds by measuring downstream channel signal distortion that results from the upstream probe signal in step 250. Step 250, may be accomplished by estimating the standard deviation of the distortion noise as described in equations 13 and 14 above.

In step 260, a determination is made if the distortion exceeds the acceptable distortion level by a predetermined offset. If the distortion exceeds the threshold, the upstream cutback attenuation is increased in step 270 by the initial cutback delta set in step 230. Otherwise, if the distortion is too small (below the ambient noise level—step 280), the method decreases the upstream cutback attenuation in step 290 by the initial cutback delta set in step 230.

The method 210 proceeds to check if the cutback attenuation value has become less than 0 in step 300. If the cutback attenuation is indeed less than 0, the method 210 sets the cutback attenuation to 0 in step 310 and terminates the method. If it is determined in step 300 that the cutback attenuation is greater than 0, the method proceeds to step 320, where the initial cutback attenuation delta is decreased by a factor of 2. Next, a determination is made in step 330 if the cutback attenuation delta is 2 or greater. If yes, the method proceeds to return to step 250. Method 210 then proceeds to iterate from step 250 through to 330 until the distortion noise is within 2 dB of the desired level.

Figure 11:
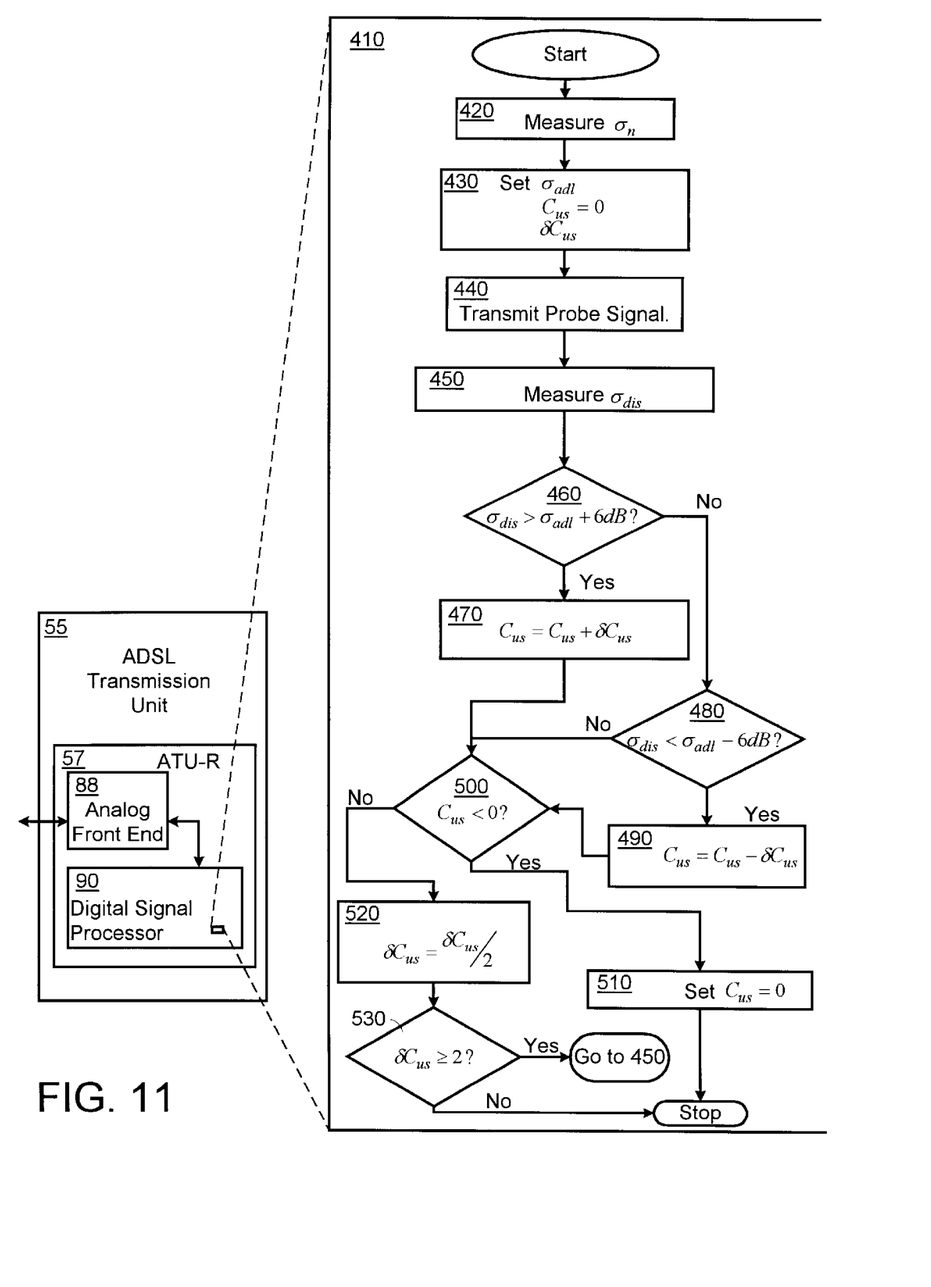
FIG. 11 is a diagram of a system that further illustrates the method of FIG. 10.

Having described the method illustrated in the flowchart of FIG. 10 for optimizing the upstream transmission power cutback value, reference is now made to FIG. 11 which further illustrates the method illustrated in FIG. 10. In this regard, method 410 describes the initialization and iterative steps to optimize the upstream power cutback.

The method 410 begins by measuring distortion noise, $\sigma_n$, in step 420. Distortion noise is measured in select downstream channels after the central office stops transmitting in response to a customer premises request. In step 430, the method initializes an acceptable distortion level, $\sigma_{adl}$, an upstream power cutback, $C_{us}$, and a cutback attenuation delta, $\delta C_{us}$. While the central office is not transmitting on the downstream channels, the method transmits a probe signal across upstream channels 6–32 in step 440. Next, in step 450, the downstream signal distortion, $\sigma_{dis}$, is measured. Having measured the downstream signal distortion due to the upstream probe signal, the method proceeds to determine if $\sigma_{dis}$ is greater than the sum of $\sigma_{adl}$ and an offset value in step 460. If yes, step 460 is performed wherein the upstream power cutback, $C_{us}$, is increased by the cutback attenuation delta, $\delta C_{us}$. If in step 460 it was determined that $\sigma_{dis}$ is not greater than the sum of $\sigma_{adl}$ and an offset value, then step 480 is performed, wherein a determination is made if $\sigma_{dis}$ is less than the difference of $\sigma_{adl}$ and an offset value. If yes, step 490 is performed wherein the upstream power cutback, $C_{us}$, is decreased by the cutback attenuation delta, $\delta C_{us}$.

Next, in step 500, a determination is made whether the upstream power cutback, $C_{us}$, is less than zero. As shown in FIG. 11, step 500 is performed after step 470, after a step 480 "No" determination, or after step 490. If the upstream power cutback, $C_{us}$, is less than zero, step 510 is performed. In step 510, the upstream power cutback attenuation is set to zero and the method terminates. If it is determined in step 500 that the upstream power cutback, $C_{us}$, is greater than zero, then step 520 is performed. In step 520, the cutback attenuation delta, $\delta C_{us}$, is decreased by a factor of two. Next, the method 410 performs step 530 to verify that $\delta C_{us}$ is greater than or equal to two. If yes, the method returns to step 450 and method steps 450 through 530 will be repeated as necessary to optimize the upstream power cutback.

Relationship Between Upstream and Downstream Power Cutback

In addition to providing for a cutback in upstream signal power, the G.Lite ADSL standard also allows for a cutback of the downstream signal power. For short local loops, the downstream signal attenuation is low and the total ADSL power received at the customer premises might be such that distortion is generated as the signal interacts with the POTS components.

Since the characteristics of the upstream and the downstream ADSL signals are identical, signal power is the only factor that can be used to determine if distortion will be generated. The maximum acceptable upstream power as observed at the POTS is also the maximum acceptable downstream power measured at the POTS. As a result, the following equation applies at the customer premises:

$$P_{ds}'=P_{us}, \qquad \text{Eq.16}$$

where, $P_{ds}'$ is the downstream signal power observed at the customer premises receiver and $P_{us}$ is the upstream signal power transmitted from the customer premises. Introducing the downstream channel attenuation $L_{ds}$ yields:

$$\frac{P_{ds}}{L_{ds}} = P_{us}. \qquad \text{Eq. 17}$$

Alternatively, since signal power can be expressed as the product of power spectral density and bandwidth:

$$\frac{\gamma_{ds} \cdot B_{ds}}{L_{ds}} = \gamma_{us} \cdot B_{us}. \qquad \text{Eq. 18}$$

In this case, the power spectral density is affected by a power cutback factors ($C_{ds}$ and $C_{us}$) relative to the nominal power spectral density:

$$\frac{\gamma_{ds,N}}{C_{ds}} \cdot \frac{B_{ds}}{L_{ds}} = \frac{\gamma_{us,N}}{C_{us}} \cdot B_{us}. \qquad \text{Eq. 19}$$

Resolving the equation for $C_{ds}$ and porting the equation to the log domain yields:

$$C_{ds}[\text{dB}] = 10*\log\left(\frac{\gamma_{ds,N}}{\gamma_{us,N}}\right) + 10*\log\left(\frac{B_{ds}}{B_{us}}\right) + L_{ds}[\text{dB}] + C_{us}[\text{dB}]. \qquad \text{Eq. 20}$$

Knowing that $\gamma_{ds,N}$ is approximately 2 dBm/Hz down from $\gamma_{us,N}$ as revealed in FIG. 9, $B_{ds}=(128-33+1)*4$ kHz, and $B_{us}=(32-6+1)*4$ kHz, results in the following equation for $C_{ds}$:

$$C_{ds}[\text{dB}]=-2+5.5-L_{ds}[\text{dB}]+C_{us}[\text{dB}]. \qquad \text{Eq.21}$$

Since the cutback value cannot be negative, $$C_{ds}[\text{dB}]=\max[-2+5.5-L_{ds}[\text{dB}]+C_{us}[\text{dB}],0]. \qquad \text{Eq.22}$$

So, for a loop with a 10 dB downstream attenuation, and a 10 dB upstream power cutback, the downstream power cutback will be:

$$C_{ds}[\text{dB}]=-2+5.5-10+10=3.5 \text{ dB}$$

What is claimed is:

1. A method for minimizing signal distortion at the customer premises in a discrete multi-tone communications system comprising:
   transmitting a probe signal in the upstream channels of the system;
   measuring signal distortion due to the probe signal in downstream channels of the system;
   estimating voice-band distortion from the signal distortion measured in the downstream channels;
   optimizing upstream channel transmit power; and
   directing central office ADSL transmission equipment to adjust the downstream signal power.

2. The method of claim 1, wherein the probe signal is a full upstream bandwidth signal.

3. The method of claim 1, wherein the probe signal is a periodic signal.

4. The method of claim 1, wherein the probe signal comprises an ADSL-DMT standard periodic signal.

5. The method of claim 4, wherein the ADSL-DMT standard periodic signal is the R-LINE-PROBE signal.

6. The method of claim 1, wherein the step of measuring signal distortion is performed by analyzing the frequency domain values of a predetermined number of DMT standard tones in the downstream frequency band.

7. The method of claim 1, wherein the step of measuring signal distortion is performed by estimating the standard deviation of distortion noise in a predetermined number of DMT standard tones in the downstream frequency band.

8. The method of claim 7, wherein the standard deviation of distortion noise is estimated in a digital signal processor.

9. The method of claim 8, wherein the standard deviation of distortion noise is resolved over each individual complex component of the frequency domain symbol for each of the predetermined number of DMT standard tones.

10. The method of claim 1, wherein the step of optimizing upstream channel transmit power comprises adjusting the transmit power until the distortion noise observed in the downstream band falls below a predetermined threshold.

11. The method of claim 1, wherein the step of optimizing is performed with a pre-defined acceptable level of distortion noise.

12. A digital signal processor for minimizing signal distortion at the customer premises in a discrete multi-tone communication system comprising:
   means for generating a probe signal;
   means for directing the transmission of the probe signal in the upstream data channels;
   means for measuring that portion of the downstream signal power introduced by the probe signal;
   means for determining an upstream data channel signal power cutback level;
   means for determining a downstream channel signal attenuation; and
   means for commanding the central office to adjust the downstream data signal transmission power.

13. The digital signal processor of claim 12, wherein the means for measuring signal distortion is performed over frequency domain values of a predetermined number of DMT standard tones in the downstream frequency band.

14. The digital signal processor of claim 13, wherein the means for measuring signal distortion is performed by estimating the standard deviation of distortion noise in a predetermined number of DMT standard tones in the downstream frequency band.

15. The digital signal processor of claim 14, wherein the means for measuring signal distortion resolves each individual complex component of the frequency domain symbol for each of the predetermined number of DMT standard tones.

16. The digital signal processor of claim 12, wherein the means for determining an upstream data channel signal power cutback level is iterative and responsive to a predetermined acceptable signal distortion level.

17. The digital signal processor of claim 12, wherein the means for commanding the central office is responsive to downstream channel signal attenuation and the upstream data channel signal power cutback factor.

18. An ADSL transmission unit—remote configured to minimize signal distortion at the customer premises comprising:
   a hybrid;
   an analog front end in communication with an ADSL transmission unit central office configured to transmit upstream data and to receive downstream data in accordance with the ADSL-DMT standard; and
   a digital signal processor configured to generate a probe signal for transmission across the upstream data channels, the digital signal processor further configured to measure the resulting noise at the analog front end in the downstream data frequency range, the digital signal processor further configured to optimize the upstream power cutback in response to the resulting noise, the digital signal processor further configured to command an ADSL transmission unit—central office to adjust the downstream transmission power in response to the optimized upstream power cutback and a predetermined acceptable noise threshold.

19. The apparatus of claim 18, wherein the digital signal processor is configured to measure signal distortion over frequency domain values of a predetermined number of ADSL-DMT standard tones in the downstream frequency band.

20. The apparatus of claim 18, wherein the digital signal processor is configured to measure signal distortion by estimating the standard deviation of distortion noise in a predetermined number of ADSL-DMT standard tones in the downstream frequency band.

21. The apparatus of claim 18, wherein the digital signal processor is configured to measure signal distortion by resolving each individual complex component of the frequency domain symbol for each of the predetermined number of ADSL-DMT standard tones.

22. The apparatus of claim 18, wherein the digital signal processor determines an upstream data channel signal power cutback level in an iterative and responsive process to a predetermined acceptable signal distortion level.

23. The apparatus of claim 18, wherein the digital signal processor initiates a command to the central office in response to downstream channel signal attenuation and the upstream data channel signal power cutback factor.

* * * * *